(12) United States Patent
Barreira Avegliano et al.

(10) Patent No.: US 10,719,996 B2
(45) Date of Patent: *Jul. 21, 2020

(54) DETERMINING VEHICLE OCCUPANCY USING SENSORS

(71) Applicant: International Business Machines Corporation, Armonk, NY (US)

(72) Inventors: Priscilla Barreira Avegliano, Sao Paulo (BR); Carlos Henrique Cardonha, Sao Paulo (BR); Ricardo Guimaraes Herrmann, Consolacao (BR); Diego Sanchez Gallo, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 239 days.

This patent is subject to a terminal disclaimer.

(21) Appl. No.: 15/857,722

(22) Filed: Dec. 29, 2017

(65) Prior Publication Data

US 2018/0122155 A1    May 3, 2018

Related U.S. Application Data

(63) Continuation of application No. 14/976,508, filed on Dec. 21, 2015, now Pat. No. 9,928,667.

(51) Int. Cl.
*G07B 15/06*    (2011.01)
*G01C 21/34*    (2006.01)
(Continued)

(52) U.S. Cl.
CPC ............ *G07B 15/06* (2013.01); *G01C 21/34* (2013.01); *G06Q 30/04* (2013.01); *G07B 15/063* (2013.01);
(Continued)

(58) Field of Classification Search
CPC ....... G07B 15/06; G07B 15/063; H04W 4/42; H04W 4/44; G01C 21/34; G06Q 30/04; G08G 1/017
(Continued)

(56) References Cited

U.S. PATENT DOCUMENTS 8,013,760 B2   9/2011  Turnock et al.
8,055,534 B2   11/2011 Ashby et al.
(Continued)

FOREIGN PATENT DOCUMENTS

CN   101743576    4/2013
CN   103366404    10/2013
(Continued)

OTHER PUBLICATIONS

List of IBM Patents or Patent Applications Treated As Related.

*Primary Examiner* — Thomas G Black
*Assistant Examiner* — Luke Huynh
(74) *Attorney, Agent, or Firm* — Fleit Intellectual Property Law; Gary Winer (57) ABSTRACT

A method of determining occupancy of a vehicle along a route is determined by processing data generated by two different smartphones reported to be travelling in the same vehicle. An app executing within each smartphone. Information that has been transmitted from the two smartphones includes a unique identification of the mobile computing device and a unique identification of a person associated with the mobile computing device. Sensor data is also received, which corresponds to a local ambient environment inside the vehicle of the mobile computing device generating the data. The sensor data does not include location data or data entered by a user. The received data is used to (Continued)

determine if both mobile computing devices were actually present during the portions of the route, by comparing the data from each device.

19 Claims, 3 Drawing Sheets

(51) Int. Cl.
  *G06Q 30/04* (2012.01)
  *H04W 4/44* (2018.01)
  *G08G 1/017* (2006.01)
  *H04W 4/42* (2018.01)
  *G08G 1/01* (2006.01)
  *H04W 4/02* (2018.01)
  *H04W 4/80* (2018.01)

(52) U.S. Cl.
  CPC .............. *G08G 1/017* (2013.01); *H04W 4/42* (2018.02); *H04W 4/44* (2018.02); *G08G 1/012* (2013.01); *H04W 4/027* (2013.01); *H04W 4/80* (2018.02)

(58) Field of Classification Search
  USPC ........................................................ 701/482
  See application file for complete search history.

(56) References Cited

U.S. PATENT DOCUMENTS

| | | | | |
|---|---|---|---|---|
| 8,065,181 | B2 * | 11/2011 | McNew | G06Q 10/06 |
| | | | | 705/13 |
| 8,566,148 | B2 * | 10/2013 | Karner | G06Q 30/0283 |
| | | | | 705/13 |
| 9,595,139 | B1 * | 3/2017 | Breed | G07B 15/063 |
| 9,665,991 | B2 * | 5/2017 | Simanek | G06Q 30/0207 |
| 2006/0180377 | A1 | 8/2006 | Hofbeck et al. | |
| 2006/0200306 | A1 * | 9/2006 | Adamcyzk | G01C 21/3438 |
| | | | | 701/482 |
| 2008/0175438 | A1 | 7/2008 | Alves | |
| 2013/0006724 | A1 * | 1/2013 | Simanek | G06Q 30/0207 |
| | | | | 705/13 |
| 2013/0141574 | A1 | 6/2013 | Dalal et al. | |
| 2013/0248589 | A1 | 9/2013 | Gravelle et al. | |
| 2015/0062340 | A1 | 3/2015 | Datta et al. | |

FOREIGN PATENT DOCUMENTS

| | | |
|---|---|---|
| EP | 2275996 | 1/2011 |
| EP | 2503514 | 9/2012 |
| WO | 2009149099 | 12/2009 |
| WO | 2013004864 | 1/2013 |

* cited by examiner

DETERMINING VEHICLE OCCUPANCY USING SENSORS

CROSS REFERENCE TO RELATED APPLICATIONS

This application claims the benefit of related U.S. patent application Ser. No. 14/976,508, filed Dec. 21, 2015, the contents of which are incorporated herein by reference in their entirety.

FIELD OF THE DISCLOSURE

The disclosure relates to a system and method for determining the number of occupants in a vehicle, and in particular determining a number of persons in a vehicle using sensor data of mobile computing devices within the vehicle.

BACKGROUND OF THE DISCLOSURE

Governments and roadway operating organizations attempt to incentivize carpooling as a mechanism to reduce traffic jams, fuel consumption, and pollution. Having high-occupancy vehicle lanes (HOV lanes, also known as carpooling lanes) exclusive for vehicles carrying a minimum number of people (often 2 or 3) is one of the incentives that can be offered. Another incentive for carpooling is offering discount at tolls for HOV.

U.S. Patent Publication 2008/0175438 discloses a traffic lane enforcement system including a digital camera for providing for a vehicle image and a passenger image of a vehicle passing by in a controlled traffic lane;

WO 2013004864 discloses an automatic control system for vehicles in occupation of a toll station including image acquisition devices, means for removing the effects of glare on the windshield, means for determining the number of occupants in the vehicle, and means for acquiring images comprise at least two cameras, in which each camera acquires at least one image.

U.S. Pat. No. 8,013,760 discloses an electronic toll collection system, reader, and transponder for communicating occupancy status. The vehicle-mounted transponder includes a selection device that permits a user to select between a normal and high occupancy state. The transponder reports its occupancy status to a reader. If the electronic toll collection system processes a toll transaction and the transponder claims high occupancy status during the toll transaction, the fact that high occupancy status was claimed during the transaction is recorded in memory within the transponder for later enforcement and verification purposes.

EP 2275996 discloses providing at least one sensor placed in each of the seats of the vehicle, a controlling unit linked to the sensors for the reception of a signal informing of the presence or absence of a person sitting on the seat, and a data transmission unit for sending the data captured by said sensors upon receiving an order from the external device, in such a way that when the vehicle enters an area, the payment facility of said area, which is adapted for communicating with the transmission unit provided in the vehicle, receives a signal informing it of the number of passengers sitting inside the vehicle and subsequently the payment facility establishes a fee according to the number of passengers.

U.S. Patent Publication 2006/0180377 discloses a single high-frequency transmitter which emits radiation in a vehicle that is reflected depending on whether a seat is occupied, and transmits to a receiver for evaluation with regard to the radiation intensity.

EP 2503514 discloses a system to verify a carpool operation comprising a server, two digital assistants each equipped with a means of acquiring data, including acceleration, position, speed and rotation of the vehicle during a time interval corresponding to a movement of a carrier of the digital assistant and a communication network between the server and the two digital assistants. The server compares geolocation data from both digital assistants for determining a carpool.

SUMMARY OF THE DISCLOSURE

In an embodiment of the disclosure, a method of determining occupancy of a vehicle along a route executing software upon at least one processor, the software stored on non-transitory media, the at least one processor configured by the software to: receive information from each of a plurality of mobile computing devices, each mobile computing device associated with a person, the information including a unique identification of the vehicle and a unique identification of at least one of the transmitting mobile computing device and the person associated with the transmitting mobile computing device; receive data during a plurality of time intervals during the trip corresponding to portions of the route, by at least one electronic sensor of each of the plurality of mobile computing devices, the data corresponding to a local ambient environment of the mobile computing device generating the data; and communicate the received data to at least one server; executing software upon the server, the software stored on non-transitory media, the server configured by the software to: compare the received data to determine, during one or more predetermined portions of the route, the number of mobile computing devices having sensor data that mutually corresponded during the predetermined portions of the route; and calculate a fee, based on the compared data, corresponding to the number of mobile computing devices having sensor data which mutually corresponded.

In variations thereof, the electronic sensor is selected from at least one of a magnetometer, gyroscope, GPS, accelerometer, and microphone; the at least one processor forms part of at least one server, and the received information and the received data were communicated to the at least one server by a software application (app) executing upon each of the plurality of mobile computing devices; when the unique identification of the person associated with the transmitting mobile computing device is received, the identification of the person is determined based upon a unique login carried out using the app; wherein the data corresponding to a local ambient environmental parameter includes data corresponding to at least one of a magnetic field, local movements, a geographic location, acceleration movements, and sounds; the data corresponding to a local ambient environmental parameter further includes data corresponding to parameters associated with living people; and/or the parameters associated with living people include heartbeat sounds, breathing sounds, heat output.

In further variations thereof, the data corresponding to a local ambient environmental parameter includes data corresponding to at least one of heartbeat sounds, breathing sounds, human heat output, and human voices; wherein when the unique identification of the person associated with the transmitting mobile computing device is received, the identification of the person is determined based upon a fingerprint reading; wherein data that was generated is received from each mobile phone via a long range wireless communication network; wherein the unique identification of the vehicle is license plate information; and/or wherein data that was generated is received from a transmitting device within the vehicle that is not one of the plurality of mobile computing devices, the transmitting device receiving the generated data from at least one mobile computing device in the vehicle.

In another variation thereof, comparing received data includes determining if the data obtained from all of the plurality of mobile computing devices mutually corresponded within predetermined limits, and if not, generating an indication that all mobile computing devices may not have been within the vehicle, the indication usable to create an inference that not all people associated with the plurality of mobile computing devices were within the vehicle during the corresponding time interval In another embodiment of the disclosure, a method of determining occupancy of a vehicle during a trip travelled upon a fee based roadway comprises executing software upon at least one computer server, the software stored on non-transitory media, the at least one server configured by the software to: receive information from each of a plurality of mobile computing devices, each mobile computing device associated with a person, the information including a unique identification of the vehicle and a unique identification of at least one of the transmitting mobile computing device and the person associated with the transmitting mobile computing device; receive data that was generated, during a time interval of the trip, by a plurality of electronic sensors selected from the group consisting of a magnetometer, gyroscope, GPS, accelerometer, and microphone, within each of the plurality of mobile computing devices, the data corresponding to local ambient environmental conditions of the mobile computing device generating the data; compare the received data to determine if the data obtained from all of the plurality of mobile computing devices mutually correspond within predetermined limits, to determine a probable vehicle occupant count; and communicate the probable vehicle occupant count and identification information of the vehicle to a server configured for determining fees for vehicles travelling on the fee based roadway.

In variations thereof, the received information and the received data were communicated to the at least one server by a software application (app) executing upon each of the plurality of mobile computing devices; wherein when the unique identification of the person associated with the transmitting mobile computing device is received, the identification of the person is determined based upon a unique login carried out using the app; and/or wherein data that was generated is received from a transmitting device within the vehicle that is not one of the plurality of mobile computing devices, the transmitting device receiving the generated data from a plurality of the mobile computing devices in the vehicle.

In a further embodiment of the disclosure, a method of determining occupancy of a vehicle during a trip travelled upon a fee based roadway, comprises executing a software app upon each of a plurality of mobile computing devices travelling in the vehicle during the trip, the app configured to enable each of the plurality of mobile computing devices to: a) receive identification information pertaining to an identification of the vehicle; b) generate data during a time interval of the trip, by at least one electronic sensor selected from the group consisting of a magnetometer, gyroscope, GPS, accelerometer, and microphone, within the mobile computing device, the data corresponding to local ambient environmental conditions of the mobile computing device; and c) communicate the identification information of the vehicle, the generated data, and identification information relating to the mobile computing device, to at least one server, using a long range wireless communication protocol; and executing software upon at least one computer server, the software stored on non-transitory media, the at least one server configured by the software to: receive the communicated information from each of the plurality of mobile computing devices; compare the received data that was generated to determine if the data obtained from all of the plurality of mobile computing devices mutually correspond within predetermined limits, to determine a probable vehicle occupant count; and calculate, using the probable vehicle occupant count and identification information of the vehicle, a fee for the vehicle for travelling on the fee based roadway.

In variations thereof, the method further comprises comparing the received data that was generated includes processing the data as arbitrary digital information that does not contain an underlying meaning or purpose; and/or the data generated during a time interval of the trip is generated during more than one interval, and whereby the fee is determined based upon the probably vehicle occupant count during a particular interval.

In another embodiment of the disclosure, a method of determining occupancy of a vehicle along a route comprises executing software upon at least one processor, the software stored on non-transitory media, the at least one processor configured by the software to receive information transmitted from each of at least a first and a second mobile computing device, the information including a unique identification of the mobile computing device and a unique identification of a person associated with the mobile computing device; receive sensor data transmitted during a plurality of time intervals during the trip corresponding to portions of the route, the sensor data generated by at least one electronic sensor of each of the first and second mobile computing device, the data corresponding to a local ambient environment inside the vehicle of the mobile computing device generating the data, the sensor data not including location data or data entered by a user of the first or second mobile computing device; and use the received data of a first of the plurality of mobile computing devices to determine if both of the first and second mobile computing devices were actually present during the one or more predetermined portions of the route, by comparing the sensor data received from the first mobile computing device with the sensor data received from the second mobile computing device.

In variations thereof, the received sensor data was transmitted by a software application ("app") executing upon each of the first and second mobile computing devices; the unique identification of the person associated with the first or second mobile computing device is received, the identification of the person is determined based upon a unique login carried out using the app; the data corresponding to a local ambient environmental parameter further includes data corresponding to parameters associated with living people; the parameters associated with living people include heartbeat sounds, breathing sounds, heat output; the data corresponding to a local ambient environmental parameter includes data corresponding to at least one of heartbeat sounds, breathing sounds, human heat output, and human voices; the unique identification of the person associated with the transmitting mobile computing device is received, the identification of the person is determined based upon a fingerprint reading; the data received from each mobile phone is transmitted via a long range wireless communication network; the unique identification of the vehicle includes license plate information.

In other variations thereof, comparing the received data includes determining if the data obtained from the first and second mobile computing devices mutually corresponded within predetermined limits, and if not, generating an indication that both the first and second mobile computing devices may not have been within the uniquely identified vehicle during a time interval during the trip; the method further includes, when the compared data obtained from each of the first and second mobile computing devices do not mutually correspond within predetermined limits, using data received from a third mobile computing device within the vehicle to determine which received data of the first and second mobile computing devices does not correspond to a mobile computing device within the vehicle during the time interval; and/or the method further includes, when the compared data obtained from each of the first and second mobile computing devices do not mutually correspond within predetermined limits, using location information from at least a selected one of the first and second mobile computing devices to determine if the selected device was not in the vehicle during the time interval.

In still further variations thereof, the data corresponding to a local ambient environmental parameter includes data corresponding to at least one of a magnetic field, local movements, acceleration movements, and sounds; when comparing the received data, the data is treated as arbitrary digital information that does not contain an underlying meaning or purpose; and/or when comparing the received data, data from each sensor is considered to collectively form a unique pattern of data without an underlying meaning, and the unique pattern of data is compared between mobile computing devices to determine if the compared mobile computing devices were in the same vehicle when the data was generated.

In another embodiment of the disclosure, a method of determining occupancy of a vehicle during a trip travelled upon a fee based roadway comprises executing software upon at least one computer server, the software stored on non-transitory media, the at least one server configured by the software to: receive information from each of a first and second smartphone, each of the first and second smartphone associated with a person, the information including a unique identification of the vehicle and a unique identification of at least one of the smartphone and the person associated with the smartphone; receive data that was generated, during a time interval of the trip, by a plurality of electronic sensors selected from the group consisting of a magnetometer, gyroscope, accelerometer, and microphone, within each of the first and second smartphones, the data corresponding to local ambient environmental conditions inside the vehicle of the smartphone generating the data; compare the received data by comparing the raw data of the electronic sensors without analyzing the underlying meaning of the sensor data, to determine if the data obtained from the first and second smartphones mutually correspond within predetermined limits, to determine if both of the uniquely identified smartphones are within the vehicle during the time interval of the trip; and assess fees to the person associated with each of the first and second smartphone based upon the compared data.

In variations thereof, the received information and the received data were communicated to the at least one server by a software application (app) executing upon each of the plurality of mobile computing devices; and/or when the unique identification of the person associated with the first or second mobile computing device is received, the identification of the person is determined based upon a unique login carried out using the app.

In a further embodiment of the disclosure, a method of determining occupancy of a vehicle during a trip travelled upon a fee based roadway comprises executing a software app upon first and second mobile computing devices travelling in the vehicle during the trip, the app configured to enable each of the first and second mobile computing devices to: a) receive identification information pertaining to an identification of the vehicle; b) generate data during a time interval of the trip, by at least one electronic sensor selected from the group consisting of a magnetometer, gyroscope, altimeter, accelerometer, and microphone, within the mobile computing device, the data corresponding to local ambient environmental conditions inside the vehicle of the mobile computing device; and c) communicate the identification information of the vehicle, the generated data, and identification information relating to the mobile computing device, to at least one server, using a long range wireless communication protocol; and executing software upon at least one computer server, the software stored on non-transitory media, the at least one server configured by the software to: receive the communicated information from each of the plurality of mobile computing devices; compare the received data that was generated by comparing the raw data of the electronic sensors of the first and second mobile computing devices, without analyzing the underlying meaning of the sensor data, to determine if the data obtained from each of the first and second mobile computing devices mutually correspond within predetermined limits, to determine if both the first and second mobile computing devices were present in the vehicle during the time interval of the trip; and calculate, using the compared data, fees for use of the fee based roadway.

In a variation thereof, the method further includes, when the data obtained from each of the first and second mobile computing devices do not mutually correspond within predetermined limits, using location information from at least a selected one of the first and second mobile computing devices to determine if the selected device was not in the vehicle during the time interval.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION OF THE DISCLOSURE

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

In accordance with the disclosure, challenges arise in regard to verifying compliance of vehicles travelling in high occupancy vehicle (HOV) lanes, with respect to the number of passengers in a vehicle. Non-compliant vehicles increase usage of the HOV lanes, and accordingly, affect traffic and pollution, and adversely impact roadway planning and finances. Prior art approaches to mitigating non-compliant vehicles can fail, variously, due to, for example, a requirement for expensive detection equipment; failure of detection equipment; failure to visually detect passengers in a rear seat, or through tinted windows; time delays associated with stopping traffic to manually check; failure of drivers or occupants to truthfully report occupancy; failure to validate occupancy as reported; and failure to allocate expense or credits based on vehicle occupancy.

Figures 1, 2, 3:
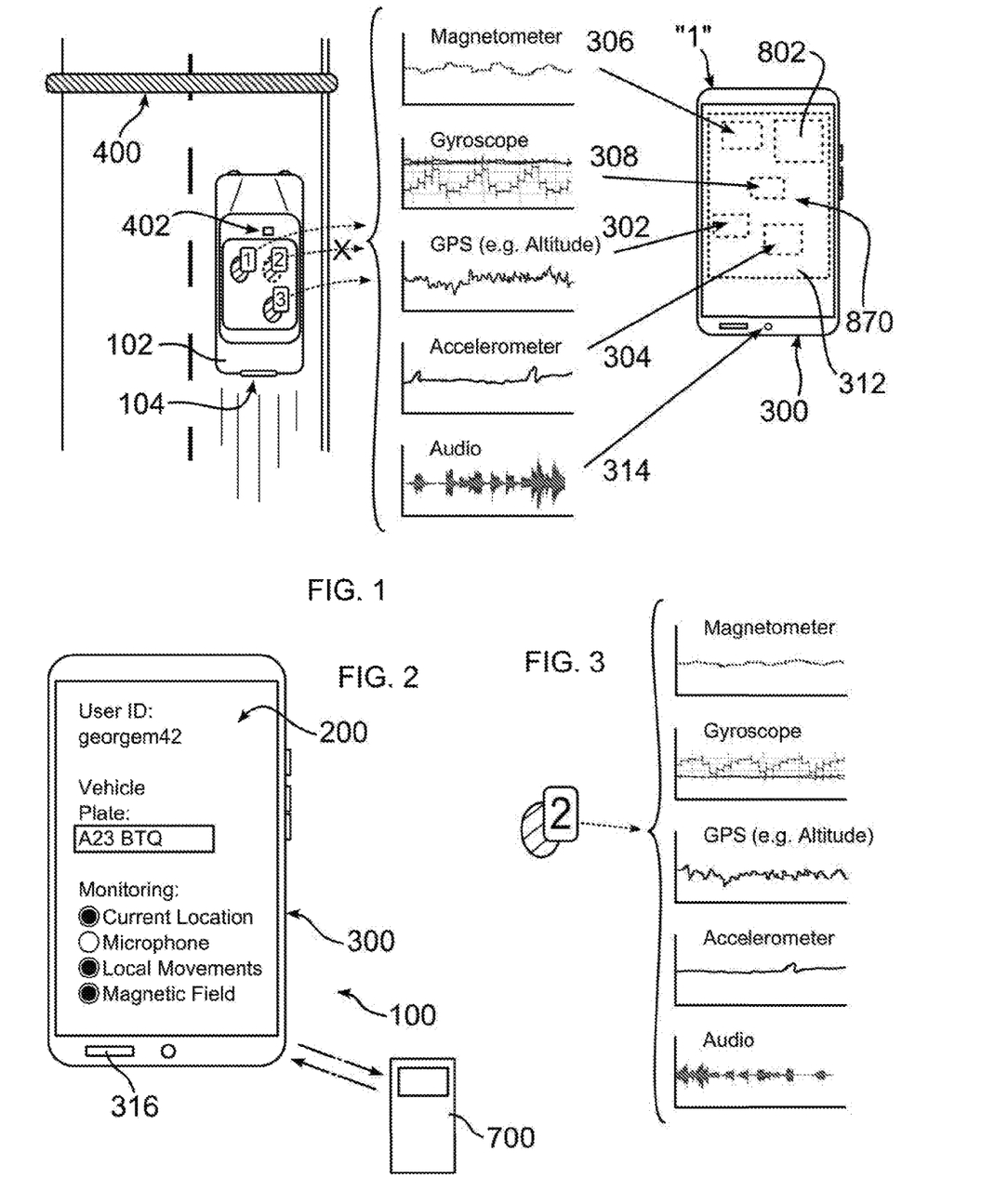
FIG. 1 depicts, in accordance with the disclosure, a vehicle traveling upon a fee based roadway, the vehicle having several occupants each having an associated mobile computing device, each of the mobile computing devices generating data as shown, with one device generating data which does not match the other two devices, the figure further depicting an example mobile computing device.
FIG. 2 depicts an example screen contents of an application of the disclosure, in which a user, vehicle, and data gathering preferences are shown.
FIG. 3 illustrates data generated by the device "2" of FIG. 1, showing that the data is substantially different than the data generated by either device "1" and "3" of FIG. 1.

With reference to FIGS. 1-3, the disclosure provides a system 100 and method for using personal mobile computing devices to perform an assessment or validation of the number of passengers inside a vehicle 102. In an embodiment, the driver and all passengers each use an application 200, of the disclosure, which may be a downloadable app, and which is installed within and executed upon their own personal computing device 300, which may be a tablet device or a smartphone, for example, or any other mobile computing device that can be carried with a passenger into a vehicle. The devices are advantageously uniquely associated with a particular user, as described elsewhere herein. Each passenger uses the application to log themselves into, or otherwise identify themselves, to a server 700 of the disclosure, and to enter identification of the vehicle in which they are travelling. The vehicle ID can be a unique ID that was assigned to the vehicle, and could be, for example, the license plate of the vehicle. In an embodiment, a traveler can take a picture of the vehicle license plate 104 and the application can extract identifying information from the photo.

Figure 5:
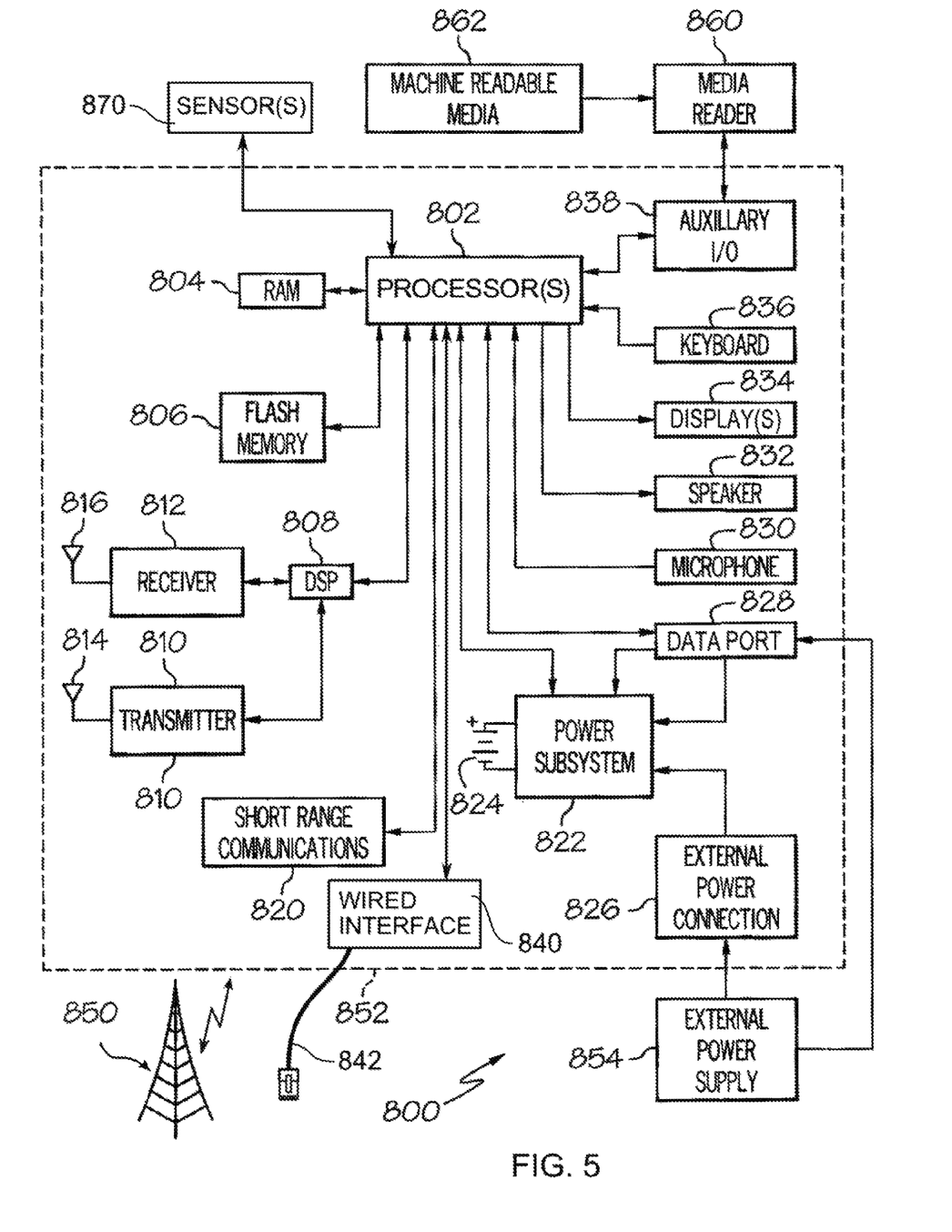
FIG. 5 illustrates an example mobile computing device, all or portions of which can be used to carry out the disclosure.

With reference to FIG. 1, once the user has identified themselves and the vehicle using the application 200, application 200 can begin to collect data from sensors 870 mounted internally within the personal computing device 300, for example mounted on a circuit board 312. Sensors 870 can be configured to communicate data to a microprocessor 802, possibly using a digital signal processor 808 (FIG. 5). The sensors provide data which is unique to the particular local ambient environment or environmental conditions within the vehicle in which the passenger and their associated device 300 are travelling. Such data can include a location of the device, using, for example, one or more of a GPS 302, assisted GPS, cached satellite data, Cell ID, WiFi, inertial sensors, barometer or altimeter sensor, short-range wireless system, BLUETOOTH beacon, terrestrial transmitters, or any other known or hereinafter developed method.

Such data can further include the uses of devices which return information pertaining to local movement of the device, as opposed to a location of the device, which can include using an internal GPS 302, accelerometer 304, magnetometer 306, altimeter, or gyroscope 308, and any other sensor which detects movement and which is known or hereinafter developed.

Other sensors can measure either static conditions or conditions which change over time, including a magnetometer, temperature sensor, or pressure sensor. In addition, a microphone 314 of device 300 can provide audio data.

As shown in FIG. 2, application 200 can enable the user to select which data devices, or in the example shown, types of data, which will be collected, monitored, or used at a given time, in order to address any privacy concerns. In the example shown, the user has enabled 'Current Location', allowing application 200 to obtain location data from devices associated with location services, or which otherwise determine a location of device 300 geographically. In the example shown, the microphone and its audio data will not be used, however local movements that are not associated with a geographic location, and measurements of a local magnetic field would be allowed. Application 200, shown in FIG. 2, further shows a currently logged in user, as well as the license plate of a vehicle that the user has indicated he will be traveling in.

Referring again to FIG. 1, assuming a user has not disenabled the use of any sensors using application 200, as described above, it may be seen that data from a magnetometer 306, gyroscope 308, GPS 302, accelerometer 304, and a microphone 314 have been collected. A graph associated with each sensor is shown in order to illustrate how the data from each of sensors 870 forms a unique pattern of data, whether or not this pattern of data is analyzed for an underlying meaning or purpose. While the various sensors are shown in FIG. 1 as separate electronic components positioned upon a circuit board 312, it should be understood that some of the components may be combined within a single component.

In FIG. 1, we see that the data collected at right is provided by sensors associated with a device 300 indicated with the numeral "1", and further that device "1" is associated with the driver of vehicle 102. The sensor data generated by the device of passenger "3" matches that of the device "1". Additionally, as illustrated, the sensor data provided by the sensors of a device 300 marked "2", in the passenger seat, is not similar to that of devices "1" or "3", and as representatively illustrated in FIG. 3, the sensor data from device "2" is substantially different than that of devices "1" and "3". While some deviation in sensor data is expected for two different devices 300 located at different places within a vehicle, it may be determined, based on the type of sensor data being analyzed, to what extent the respective data can differ before they clearly do not correspond to one or more other devices within the same vehicle.

Such a "binary" yes/no, clearly the same/clearly not the same relationship between sensory data of two different devices can be sufficient, in accordance with the disclosure, for making a determination that indeed, the devices were travelling within the same ambient environment, and therefore were likely to be within the same vehicle when the sensor data was obtained. In this manner, at least for As of determining an occupancy count for arriving at an HOV toll or toll violation, this may be sufficiently accurate. Similarly, if the sensor data from two devices is deemed to diverge substantially, this may be sufficient to conclude that the two devices were probably not in the same ambient environment, and were not likely to have been in the same vehicle.

A comparison between sensor data of a first device and a second device need only be carried out to a point where the conclusion is reasonably accurate for a purpose. Accordingly, a set of parameters or limits are predefined or predetermined, which are applied in comparing the respective sensor data, and which correspond to a desired level of accuracy. For example, a highway authority may choose to have software of the disclosure randomly compare only one, two, or three sensor data types between two devices, or may successively compare sensor types one at a time, only until a conclusion can be made with a predetermined statistical confidence level, that any two devices are sufficiently likely to have been in the same vehicle. Alternatively, before levying a significant penalty, all available data could be compared, particularly where data relating to any questionable occupancy can be stored for careful analysis later.

It should further be understood that data corresponding to sensors need not be processed to determine its underlying meaning. For purposes of the disclosure, it can be sufficient to simply compare a profile or signature of the data, for example using averaging, pattern matching, and other rapid, statistical methods of comparison which are known in the art or are hereinafter developed. Alternatively stated, the data can be treated as an arbitrary digital bit pattern or signature, wherein a comparison of the digital pattern or signature between devices 300 is made, without regard to any meaning within the data. As before, where it is desired to have a high degree of certainty as to whether two devices were in the same vehicle, the underlying meaning of the data can be analyzed, for example to translate sensor data to a specific geographic location, or to determine a particular distance travelled. For privacy concerns, it is possible to only store data which is representative of the sensed data, for example where data from all devices are compressed or otherwise summarized in the same manner, so that a comparison is still valid, even if the meaning of the underlying data has been irretrievably lost.

There may be a presumption that the data obtained from a device 300 associated with the driver represents the true ambient conditions of the vehicle. However, it may be possible to detect a device that is not present in the vehicle as reported by determining, by the comparison, that one device does not match all other devices in the vehicle. In this manner, an inference that device "2" is not in the vehicle can be strengthened by a determination that devices "1" and "3" are both probably within the same local ambient environment, and therefore both are probably within the vehicle.

System 100 includes software application 200 that executes upon a device 300, and during operation of application 200, includes devices 300 and the sensors associated with them, as well as the one or more servers 700 which analyze and report the data, and the software 710 that executes upon servers 700 to analyze the data. In some embodiments, however, application 200 provides all of the functions of a server 700, and thus such server tasks are distributed.

Vehicle 102 can be any type of vehicle, whether on the road, air, or water, and can contain any number of passengers, any one or all carrying a device 300, as described herein.

Sensor data can be collected and analyzed in real time, or can be analyzed later, or a mix of both. Further, one or more sensors can collect data periodically, intermittently, randomly or with stochastic periodicity, for example including snapshot data corresponding to a brief period of time, while other sensors collect data over a longer period of time, for example an entire trip, or a portion of a trip, and while the vehicle is en route, in progress, or travelling along the roadway, waterway, or airspace. The method selected best exploits the ability of a sensor to capture data which uniquely identifies the ambient conditions of a device 300, taking into account energy usage and the volume of data obtained, for example.

Thus, as described above, it is possible in accordance with the disclosure to determine if two or more particular devices 300 are traveling in the same vehicle, with a reasonable degree of certainty. Next, in accordance with the disclosure, it is desired to ascertain whether each device is travelling with a person, in order to understand vehicle occupancy. Accordingly, an association of a device 300, for example device "1" or "2", with a particular person can be made in any known manner, including for example a database association made using data from a SIM card in device 300; a phone number associated with the device 300; or a unique login to an authenticating server 700 of the disclosure.

A login can be carried out using a device 300 communicating to a server 700 of the disclosure using any known or hereinafter developed means of communication, including BLUETOOTH, WiFi, LTE, or via a wired connection to another device in communication with server 700. Server 700 can be located within the cloud, being connected to a communications network, such as the Internet, and can include one or more servers 800 at the same or different locations, which servers can also be mutually interconnected by a communications network.

In an embodiment, identifying information of the device 300, for example a serial number such as an IMEI number that was previously identified as being associated with a particular person, is combined with login information for that particular person, to create an inference or increase a probability that the device that is travelling is accompanied by the owner of the device, and more particularly, that the device is not travelling without its owner.

For purposes of the disclosure, it may not be as important to identify who an occupant is, as to establish that a particular device 300 within a vehicle is associated with only one particular person. For this reason, it can be advantageous to use a smartphone as an authenticating device 300, as typically, but certainly not always, each person has only one smartphone. However, while this may strengthen an inference or probability of the device owner being present during the trip, it is possible for a person to have more than one smartphone or device 300. Accordingly, it is advantageous for a system 100 of the disclosure to check to be sure a particular person is only reported to be traveling in one vehicle at a time. Therefore, if two devices 300 are identified as traveling, and both devices are associated with the same person, the occupancy count of any vehicle containing one of the devices is suspect. In this event, system 100 could possibly reject both devices as corresponding to an occupant.

To further associate a particular device 300 with a particular person, it may be possible to require documentation proving ownership or association between a device and a person, or to enable obtaining such information from a registrar of the device, for example a phone company.

Notwithstanding the foregoing, it remains possible, although not convenient, for a person to associate themselves with a device, and to provide the device and login information to a traveler, for purposes of enabling the traveler to pretend to be traveling with an additional occupant. Accordingly, in accordance with the disclosure, sensor information pertaining to biometric information of the person with whom a device is associated can be collected during the trip. This can include, for example, a fingerprint reading by devices 300 which include fingerprint readers 316 and associated software, or a scanning or reading of any other uniquely identifying feature of a person. The biometric information can increase an inference or probability that a particular person was present within the vehicle during the trip, if the data collected matches previously collected or provided data.

In an alternative embodiment, biometric readings are made by one or all devices 300 within a vehicle, to determine an estimate of the total number of occupants, without determining a particular identity of any occupant. This can be carried out using application 200 and sensor data as described herein, for example, by observing a number of breathing people, heartbeats, human heat output or heat signature, or noises associated with movement in different portions of the vehicle, or by observing the number of different voices, or simultaneous speakers. This data can be compared with the number of devices 300 that are logged into server 700 and which have been reported to be within vehicle 102. If there is a mismatch between the number of people estimated to be in the vehicle, the server can indicate the mismatch, and can trigger an additional review. For example, sensor data from the devices reported to be in vehicle 102 can be monitored more closely by any known means, for example by examining photographic data taken at a toll sensor station, to determine if there is fraudulent reporting of occupancy associated with the use of a particular one of such devices. Alternatively, a match can increase an inference or probability that the reported travelers were present.

The foregoing biometric data can be analyzed by one or more of the devices 300 within the vehicle, and a total occupant count can be provided to a server 700 of the disclosure, or raw data can be sent to server 700 for analysis of the number of total occupants in the vehicle.

Once system 100 determines a number of likely occupants of a vehicle as described elsewhere herein, such information can be provided to an HOV lane automated inspection system for validation or reporting, and the automated toll system can further apply the appropriate discount based on the number of passengers reported. Alternatively, system 100 can provide occupancy data separately to roadway management, which is used alone to determine road usage, or tolls due. Data from system 100 can be compared with data provided by another system, for example an existing or alternative HOV lane automated inspection system, for increased accuracy.

In an embodiment, communication device 402, positioned in the vehicle, is operative to communicate a total number of passengers to a toll collecting hardware system during the trip, while the vehicle is travelling, for example by storing data in electronic data storage, and transmitting the information using a transmitter to a receiver alongside the roadway. In a variation thereof, the application 200 within the device 300 of the driver computes the total number of passengers based on sensor data transmitted by the other devices within the vehicle 300 to the device 300 of the driver. Alternatively, device 402 receives data from all devices 300 in the vehicle, and carries out the data comparison to determine probably occupancy within the vehicle. Whether a device 300 of the driver, or another device 300 communicates to device 402, an ad hoc network can be created among all devices 300 within the vehicle for communicating data, for example using BLUETOOTH or WiFi, or any other communication protocol available within the vehicle. Alternatively, device 402 transmits raw data to server 700, and server 700 performs the calculations to compare the data from each device 300. Discrepancies or mismatches of the data among the various devices 300, whether reported to server 700, verified by server 700, or calculated by server 700. In an embodiment, server 700 communicates vehicle occupancy data to an HOV lane inspection system or toll booth device to inform a system of operator of the validated number of passengers in a particular vehicle. This reporting can be carried out during the trip, or can be provided later, and fees can be calculated based on the actual occupancy, based on the number of devices 300 which have matching data, and or data which matches the drivers data, within predetermined limits.

Application 200 can provide information to the user of the device 300 including the total number of occupants of the vehicle determined, and any toll information associated with the device and its owner. The owner could validate the determined number of occupants, for example reporting a count that is too high. In an embodiment, server 700 sends a push notification of toll data or other data relating to the trip to the device 300. Application 200 can further obtain and use data pertaining to multiple fare schemas, and can advise the user of device 300 regarding this information, and the current rates and or fees that will be applied based upon the determined occupancy.

In an example scenario of the use of system 100:

1. A driver registers a vehicle to be used into system 100 a single time, for example using a website of the disclosure or application 200.

2. The driver and passengers each download and install the mobile application 200 a single time.

3. The driver logs into system 100 using the mobile application 200, informing or validating with system 100 the license plate number of the vehicle, at the beginning of the journey/carpooling trip.

4. Passengers also log into system 100 using the mobile application 200 as soon as they enter into the vehicle, and provide informing pertaining to an identification of the vehicle, for example the license plate characters.

5. The mobile application 200 executing upon a processor in each passenger's device will collect sensor data, for example including GPS location, acceleration values, or any other sensor data as described herein, based on permissions granted, and the availability of associated hardware within device 300, for example whether a magnetometer, gyroscope, microphone or other sensor is installed and are currently available.

6. The devices 300 within the vehicle can exchange information, for example using BLUETOOTH, WiFi, or other short range communication protocol, and one or more of application 200 can analyze the sensor data, or alternatively each device 300 or a representative device 300 can send collected sensor data using a long range communication network, such as GPRS, 3G or LTE, to a server 700 in the cloud, whereupon the sensor data can be compared among the devices 300 reported to be in the vehicle, to verify whether each device which reported a particular vehicle is actually present within the reported vehicle, or to determine a number of devices which appear to all be within the particular vehicle.

7. Based on the validation/determination above, a record can be kept, for example by server 700, of the number of passengers that were within a particular vehicle on a particular route. In an embodiment, the route is determined by manually or automatically recognizing license plate information using a vehicle identification system 400, an RFID or other electronic tag 402, or other identifying information associated with the vehicle, such as plate 104.

8. In an embodiment, another system, for example a highway toll system, electronically requests information relating to the number of occupants of a particular vehicle from server 700 only when an HOV lane automated inspection system detects that a particular vehicle has used the HOV lane. In this manner, the highway toll system can then charge an appropriate fee or fare based upon the actual occupancy of a vehicle using HOV lanes.

Example Computing System

Figure 4:
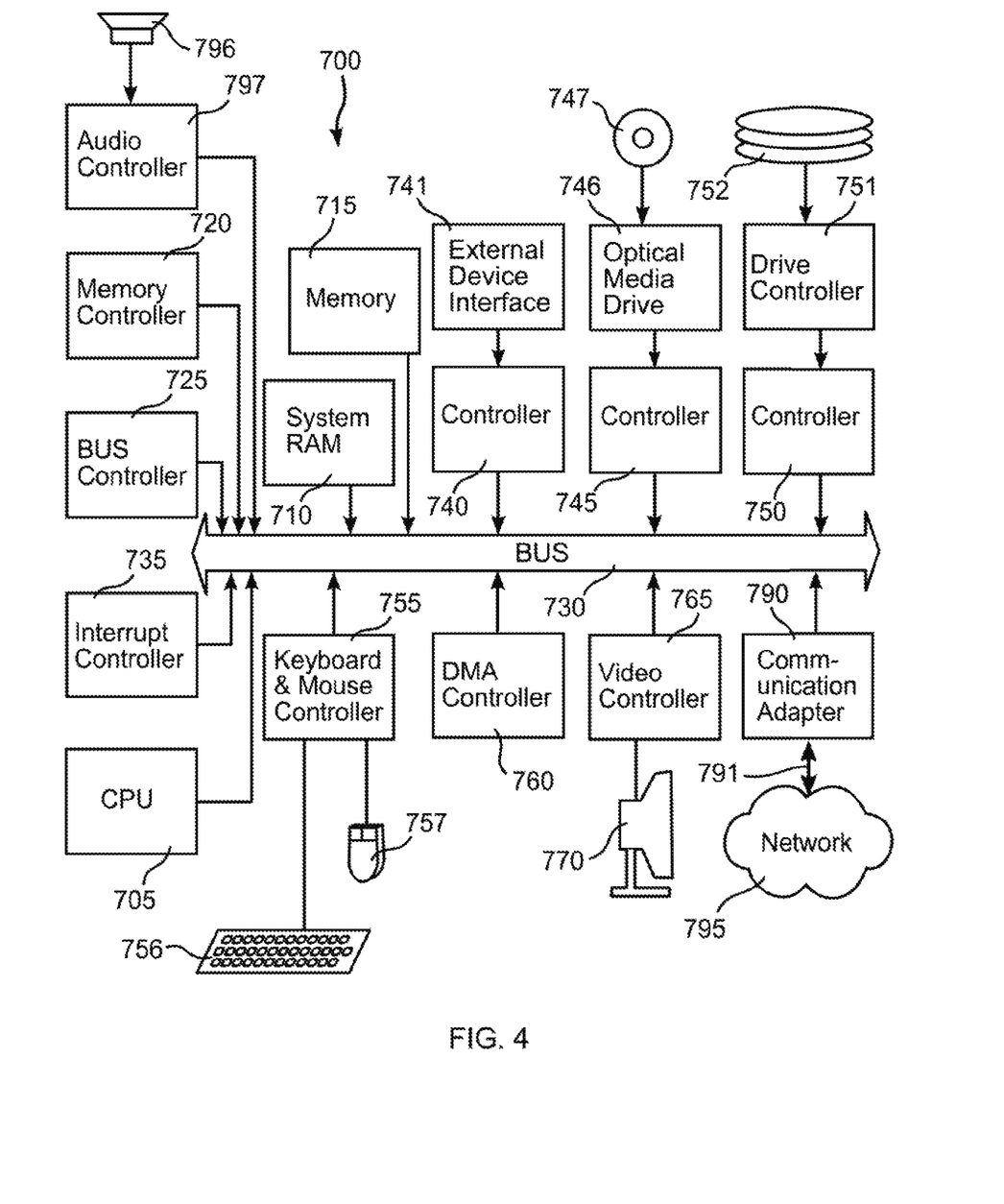
FIG. 4 illustrates an example server, all or portions of which can be used to carry out the disclosure.

FIG. 4 illustrates the system architecture for a computer system 700 which can be a computer server, and which can include the functions of a process controller, or other processor on which or with which the disclosure may be implemented. The exemplary computer system of FIG. 4 is for descriptive purposes only. Although the description may refer to terms commonly used in describing particular computer systems, the description and concepts equally apply to other systems, including systems having architectures dissimilar to FIG. 4. Computer system 700 can control temperatures, motors, pumps, flow rates, power supplies, ultrasonic energy power generators, and valves, using actuators and transducers. One or more sensors, not shown, provide input to computer system 700, which executes software stored on non-volatile memory, the software configured to received inputs from sensors or from human interface devices, in calculations for controlling system 200.

Computer system 700 includes at least one central processing unit (CPU) 705, or server, which may be implemented with a conventional microprocessor, a random access memory (RAM) 710 for temporary storage of information, and a read only memory (ROM) 715 for permanent storage of information. A memory controller 720 is provided for controlling RAM 710.

A bus 730 interconnects the components of computer system 700. A bus controller 725 is provided for controlling bus 730. An interrupt controller 735 is used for receiving and processing various interrupt signals from the system components.

Mass storage may be provided by DVD ROM 747, or flash or rotating hard disk drive 752, for example. Data and software, including software 400 of the disclosure, may be exchanged with computer system 700 via removable media such as diskette, CD ROM, DVD, Blu Ray, or other optical media 747 connectable to an Optical Media Drive 746 and Controller 745. Alternatively, other media, including for example a media stick, for example a solid state USB drive, may be connected to an External Device Interface 741, and Controller 740. Additionally, another computing device can be connected to computer system 700 through External Device Interface 741, for example by a USB connector, BLUETOOTH connector, Infrared, or WiFi connector, although other modes of connection are known or may be hereinafter developed. A hard disk 752 is part of a fixed disk drive 751 which is connected to bus 730 by controller 750. It should be understood that other storage, peripheral, and computer processing means may be developed in the future, which may advantageously be used with the disclosure.

User input to computer system 700 may be provided by a number of devices. For example, a keyboard 756 and mouse 757 are connected to bus 730 by controller 755. An audio transducer 796, which may act as both a microphone and a speaker, is connected to bus 730 by audio controller 797, as illustrated. It will be obvious to those reasonably skilled in the art that other input devices, such as a pen and/or tablet, Personal Digital Assistant (PDA), mobile/cellular phone and other devices, may be connected to bus 730 and an appropriate controller and software, as required. DMA controller 760 is provided for performing direct memory access to RAM 710. A visual display is generated by video controller 765 which controls video display 770. Computer system 700 also includes a communications adapter 790 which allows the system to be interconnected to a local area network (LAN) or a wide area network (WAN), schematically illustrated by bus 791 and network 795.

Operation of computer system 700 is generally controlled and coordinated by operating system software, such as a Windows system, commercially available from Microsoft Corp., Redmond, Wash. The operating system controls allocation of system resources and performs tasks such as processing scheduling, memory management, networking, and I/O services, among other things. In particular, an operating system resident in system memory and running on CPU 705 coordinates the operation of the other elements of computer system 700. The present disclosure may be implemented with any number of commercially available operating systems.

One or more applications, such as an HTML page server, or a commercially available communication application, may execute under the control of the operating system, operable to convey information to a user.

Example Mobile Computing System

FIG. 5, is a block diagram of an electronic device and associated components 800, which can be used in carrying out the disclosure. Mobile computing device 300 can include one or all of the components of device 800. In this example, an electronic device 852 is a wireless two-way communication device with voice and data communication capabilities. Such electronic devices communicate with a wireless voice or data network 850 using a suitable wireless communications protocol. Wireless voice communications are performed using either an analog or digital wireless communication channel. Data communications allow the electronic device 852 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 852 is an example electronic device that includes two-way wireless communications functions. Such electronic devices incorporate communication subsystem elements such as a wireless transmitter 810, a wireless receiver 812, and associated components such as one or more antenna elements 814 and 816. A digital signal processor (DSP) 808 performs processing to extract data from received wireless signals and to generate signals to be transmitted. The particular design of the communication subsystem is dependent upon the communication network and associated wireless communications protocols with which the device is intended to operate.

The electronic device 852 includes a microprocessor 802 that controls the overall operation of the electronic device 852. The microprocessor 802 interacts with the above described communications subsystem elements and also interacts with other device subsystems such as flash memory 806, random access memory (RAM) 804, auxiliary input/output (I/O) device 838, data port 828, display 834, keyboard 836, speaker 832, microphone 830, a short-range communications subsystem 820, a power subsystem 822, and any other device subsystems, such as external power supply 854 and associated power connection 826.

A battery 824 is connected to a power subsystem 822 to provide power to the circuits of the electronic device 852. The power subsystem 822 includes power distribution circuitry for providing power to the electronic device 852 and also contains battery charging circuitry to manage recharging the battery 824. The power subsystem 822 includes a battery monitoring circuit that is operable to provide a status of one or more battery status indicators, such as remaining capacity, temperature, voltage, electrical current consumption, and the like, to various components of the electronic device 852.

The data port 828 of one example is a receptacle connector 104 or a connector that to which an electrical and optical data communications circuit connector 800 engages and mates, as described above. The data port 828 is able to support data communications between the electronic device 852 and other devices through various modes of data communications, such as high speed data transfers over an optical communications circuits or over electrical data communications circuits such as a USB connection incorporated into the data port 828 of some examples. Data port 828 is able to support communications with, for example, an external computer or other device.

Data communication through data port 828 enables a user to set preferences through the external device or through a software application and extends the capabilities of the device by enabling information or software exchange through direct connections between the electronic device 852 and external data sources rather than via a wireless data communication network. In addition to data communication, the data port 828 provides power to the power subsystem 822 to charge the battery 824 or to supply power to the electronic circuits, such as microprocessor 802, of the electronic device 852.

Operating system software used by the microprocessor 802 is stored in flash memory 806. Further examples are able to use a battery backed-up RAM or other non-volatile storage data elements to store operating systems, other executable programs, or both. The operating system software, device application software, or parts thereof, are able to be temporarily loaded into volatile data storage such as RAM 804. Data received via wireless communication signals or through wired communications are also able to be stored to RAM 804.

The microprocessor 802, in addition to its operating system functions, is able to execute software applications on the electronic device 852. A predetermined set of applications that control basic device operations, including at least data and voice communication applications, is able to be installed on the electronic device 852 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 852 through, for example, the wireless network 850, an auxiliary I/O device 838, Data port 828, short-range communications subsystem 820, or any combination of these interfaces. Such applications are then able to be installed by a user in the RAM 804 or a non-volatile store for execution by the microprocessor 802.

In a data communication mode, a received signal such as a text message or web page download is processed by the communication subsystem, including wireless receiver 812 and wireless transmitter 810, and communicated data is provided the microprocessor 802, which is able to further process the received data for output to the display 834, or alternatively, to an auxiliary I/O device 838 or the Data port 828. A user of the electronic device 852 may also compose data items, such as e-mail messages, using the keyboard 836, which is able to include a complete alphanumeric keyboard or a telephone-type keypad, in conjunction with the display 834 and possibly an auxiliary I/O device 838. Such composed items are then able to be transmitted over a communication network through the communication subsystem.

For voice communications, overall operation of the electronic device 852 is substantially similar, except that received signals are generally provided to a speaker 832 and signals for transmission are generally produced by a microphone 830. Alternative voice or audio I/O subsystems, such as a voice message recording subsystem, may also be implemented on the electronic device 852. Although voice or audio signal output is generally accomplished primarily through the speaker 832, the display 834 may also be used to provide an indication of the identity of a calling party, the duration of a voice call, or other voice call related information, for example.

Depending on conditions or statuses of the electronic device 852, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 820 provides for data communication between the electronic device 852 and different systems or devices, which need not necessarily be similar devices. For example, the short-range communications subsystem 820 includes an infrared device and associated circuits and components or a Radio Frequency based communication module such as one supporting Bluetooth® communications, to provide for communication with similarly-enabled systems and devices, including the data file transfer communications described above. A wired interface 840 and connector 842 can be provided, configured to support any known wired communication protocol, for example USB.

A media reader 860 is able to be connected to an auxiliary I/O device 838 to allow, for example, loading computer readable program code of a computer program product into the electronic device 852 for storage into flash memory 806. One example of a media reader 860 is an optical drive such as a CD/DVD drive, which may be used to store data to and read data from a computer readable medium or storage product such as computer readable storage media 862. Examples of suitable computer readable storage media include optical storage media such as a CD or DVD, magnetic media, or any other suitable data storage device. Media reader 860 is alternatively able to be connected to the electronic device through the Data port 828 or computer readable program code is alternatively able to be provided to the electronic device 852 through the wireless network 850. Sensors 870 can be provided either internal or external to a housing of device 300/800, of any of the various types and functions as described herein.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

What is claimed is:

1. A method of determining occupancy of a vehicle along a route, comprising:
   executing software upon at least one processor, the software stored on non-transitory media, the at least one processor configured by the software to:
   receive information transmitted from each of at least a first and a second mobile computing device, the information including a unique identification of the mobile computing device and a unique identification of a person associated with the mobile computing device;
   receive sensor data transmitted during a plurality of time intervals during the trip corresponding to portions of the route, the sensor data generated by at least one electronic sensor of each of the first and second mobile computing device, the data corresponding to a local ambient environment inside the vehicle of the mobile computing device generating the data, the sensor data not including location data or data entered by a user of the first or second mobile computing device; and
   use the received data of a first of the plurality of mobile computing devices to determine if both of the first and second mobile computing devices were actually present during the one or more predetermined portions of the route, by comparing the sensor data received from the first mobile computing device with the sensor data received from the second mobile computing device to determine if the data obtained from the first and second mobile computing devices mutually correspond within predetermined limits, and if not, generating an indication that both the first and second mobile computing devices may not have been within the uniquely identified vehicle during a time interval during the trip.

2. The method of claim 1, wherein the received sensor data was transmitted by a software application ("app") executing upon each of the first and second mobile computing devices.

3. The method of claim 2, wherein when the unique identification of the person associated with the first or second mobile computing device is received, the identification of the person is determined based upon a unique login carried out using the app.

4. The method of claim 3, wherein when the unique identification of the person associated with the transmitting mobile computing device is received, the identification of the person is determined based upon a fingerprint reading.

5. The method of claim 1, wherein the data corresponding to a local ambient environmental parameter further includes data corresponding to parameters associated with living people.

6. The method of claim 5, wherein the parameters associated with living people include heartbeat sounds, breathing sounds, heat output.

7. The method of claim 1, wherein the data corresponding to a local ambient environmental parameter includes data corresponding to at least one of heartbeat sounds, breathing sounds, human heat output, and human voices.

8. The method of claim 1, wherein data received from each mobile phone is transmitted via a long range wireless communication network.

9. The method of claim 1, wherein the unique identification of the vehicle includes license plate information.

10. The method of claim 1, further including, when the compared data obtained from each of the first and second mobile computing devices do not mutually correspond within predetermined limits, using data received from a third mobile computing device within the vehicle to determine which received data of the first and second mobile computing devices does not correspond to a mobile computing device within the vehicle during the time interval.

11. The method of claim 1, further including, when the compared data obtained from each of the first and second mobile computing devices do not mutually correspond within predetermined limits, using location information from at least a selected one of the first and second mobile computing devices to determine if the selected device was not in the vehicle during the time interval.

12. The method of claim 1, wherein the data corresponding to a local ambient environmental parameter includes data corresponding to at least one of a magnetic field, local movements, acceleration movements, and sounds.

13. The method of claim 1, wherein when comparing the received data, the data is treated as arbitrary digital information that does not contain an underlying meaning or purpose.

14. The method of claim 1, wherein when comparing the received data, data from each sensor is considered to collectively form a unique pattern of data without an underlying meaning, and the unique pattern of data is compared between mobile computing devices to determine if the compared mobile computing devices were in the same vehicle when the data was generated.

15. The method of claim 1, wherein the received sensor data is generated by at least one of a magnetometer, gyroscope, accelerometer, and microphone, within each of the first and second smartphones.

16. The method of claim 1, wherein the received data is communicated to at least one server by a software application (app) executing upon each of the at least a first and second mobile computing devices.

17. The method of claim 15, wherein when the unique identification of the person associated with the first or second mobile computing device is received, the identification of the person is determined based upon a unique login carried out using the app.

18. A method of determining occupancy of a vehicle during a trip travelled upon a fee based roadway, comprising:

executing a software app upon first and second mobile computing devices travelling in the vehicle during the trip, the app configured to enable each of the first and second mobile computing devices to:
   a) receive identification information pertaining to an identification of the vehicle;
   b) generate data during a time interval of the trip, by at least one electronic sensor selected from the group consisting of a magnetometer, gyroscope, altimeter, accelerometer, and microphone, within the mobile computing device, the data corresponding to local ambient environmental conditions inside the vehicle of the mobile computing device; and
   c) communicate the identification information of the vehicle, the generated data, and identification information relating to the mobile computing device, to at least one server, using a long range wireless communication protocol; and executing software upon at least one computer server, the software stored on non-transitory media, the at least one server configured by the software to:

receive the communicated information from each of the plurality of mobile computing devices;

compare the received data that was generated by comparing the raw data of the electronic sensors of the first and second mobile computing devices, without analyzing the underlying meaning of the sensor data, to determine if the data obtained from each of the first and second mobile computing devices mutually correspond within predetermined limits, to determine if both the first and second mobile computing devices were present in the vehicle during the time interval of the trip; and calculate, using the compared data, fees for use of the fee based roadway.

19. The method of claim 18, further including, when the data obtained from each of the first and second mobile computing devices do not mutually correspond within predetermined limits, using location information from at least a selected one of the first and second mobile computing devices to determine if the selected device was not in the vehicle during the time interval.

* * * * *